(12) United States Patent
Bahn (10) Patent No.: US 9,273,634 B2
(45) Date of Patent: Mar. 1, 2016

(54) ROCKET STAGE AND METHOD OF IMPROVING AN EXISTING ROCKET STAGE

(76) Inventor: Patrick R. E. Bahn, Washington, DC (US)

( * ) Notice: Subject to any disclaimer, the term of this patent is extended or adjusted under 35 U.S.C. 154(b) by 806 days.

(21) Appl. No.: 13/590,164

(22) Filed: Aug. 20, 2012

(65) Prior Publication Data
US 2015/0204273 A1  Jul. 23, 2015

Related U.S. Application Data

(60) Provisional application No. 61/575,258, filed on Aug. 18, 2011.

(51) Int. Cl.
| | |
|---|---|
| *F02K 9/42* | (2006.01) |
| *B64G 1/40* | (2006.01) |
| *F02K 9/60* | (2006.01) |
| *B64G 1/52* | (2006.01) |
| *F02K 9/08* | (2006.01) |
| *F02K 9/46* | (2006.01) |
| *F02K 9/72* | (2006.01) |
| *B64G 1/00* | (2006.01) |
| *F02K 9/96* | (2006.01) |

(52) U.S. Cl.
CPC ............ *F02K 9/605* (2013.01); *B64G 1/002* (2013.01); *B64G 1/40* (2013.01); *B64G 1/52* (2013.01); *F02K 9/08* (2013.01); *F02K 9/46* (2013.01); *F02K 9/72* (2013.01); *F02K 9/96* (2013.01); *F05D 2220/80* (2013.01); *Y10T 29/49346* (2015.01)

(58) Field of Classification Search
CPC ......... B64G 1/402; B64G 1/401; F02K 9/605
See application file for complete search history.

(56) References Cited

U.S. PATENT DOCUMENTS

| | | | |
|---|---|---|---|
| 3,001,739 A | 9/1961 | Faget et al. | |
| 3,017,745 A | 1/1962 | Shirley et al. | |
| 3,021,671 A | 2/1962 | Wallach | |
| 3,516,251 A | 6/1970 | Andrews et al. | |
| 3,576,298 A | 4/1971 | Barnett et al. | |
| 3,999,728 A | 12/1976 | Zimmer | |
| 4,887,780 A | 12/1989 | Goodrich et al. | |
| 5,043,617 A | 8/1991 | Rostron | |
| 5,141,181 A * | 8/1992 | Leonard | B64G 1/002 244/172.2 |
| 5,143,327 A | 9/1992 | Martin | |
| 5,407,331 A | 4/1995 | Atsumi | |
| 5,475,722 A | 12/1995 | Culver | |
| 5,526,999 A | 6/1996 | Meston | |
| 5,572,864 A | 11/1996 | Jones | |
| 5,607,123 A | 3/1997 | Larsen | |
| 5,636,509 A | 6/1997 | Abell | |
| 5,636,512 A | 6/1997 | Culver | |
| 6,113,032 A * | 9/2000 | Cochran | B64G 1/14 244/135 R |
| 6,371,740 B1 | 4/2002 | Jansen | |
| 6,457,306 B1 | 10/2002 | Abel et al. | |
| 6,513,760 B1 * | 2/2003 | Mueller | B64G 1/002 244/171.1 |

(Continued)

FOREIGN PATENT DOCUMENTS

WO   WO 2008/105967 A2   9/2008

*Primary Examiner* — Brian M O'Hara
(74) *Attorney, Agent, or Firm* — Hoang Steve Ngo (57) ABSTRACT

The present invention relates to an improved rocket stage and a method of improving an existing rocket stage. In an embodiment, the improved rocket stage is where one can take existing rocket stages and re-propellant them. In another embodiment, the present invention is a method of improving an existing rocket stage.

24 Claims, 6 Drawing Sheets

(56) References Cited

U.S. PATENT DOCUMENTS

| | | | |
|---|---|---|---|
| 6,581,882 B2 * | 6/2003 | Valentian | 244/158.4 |
| 6,629,673 B2 | 10/2003 | Casillas et al. | |
| 7,104,507 B1 | 9/2006 | Knight | |
| 7,484,692 B1 | 2/2009 | McKinney et al. | |
| 7,762,498 B1 | 7/2010 | Henderson et al. | |
| 2003/0010013 A1 | 1/2003 | Johnstone | |
| 2007/0012821 A1 | 1/2007 | Buehler | |
| 2008/0265099 A1 | 10/2008 | Camarda et al. | |
| 2009/0211258 A1 | 8/2009 | Bulman | |
| 2009/0293448 A1 | 12/2009 | Grote et al. | |
| 2010/0252686 A1 | 10/2010 | Raymond et al. | |
| 2011/0017873 A1 | 1/2011 | Raymond | |
| 2011/0017874 A1 | 1/2011 | Haase | |

* cited by examiner

PRIOR ART

ROCKET STAGE AND METHOD OF IMPROVING AN EXISTING ROCKET STAGE

CROSS-REFERENCE TO RELATED APPLICATION

The present application claims the priority benefit of U.S. Provisional Patent Application Ser. No. 61/575,258, filed Aug. 18, 2011, which is incorporated herein by reference in its entirety.

FIELD OF THE INVENTION

The present invention relates generally to rockets, space transportation vehicles, launch vehicles and systems, crew escape vehicles and systems, launch escape towers, and space vehicle systems and devices. More specifically, the present invention relates to an improved rocket stage and a method of improving an existing rocket stage.

BACKGROUND OF THE INVENTION

Rockets, space transportation vehicles, launch vehicles and systems, crew escape vehicles and systems, launch escape towers, and space vehicle systems and devices are known in the art. The following patent documents below disclose and show some of these examples.

U.S. Pat. No. 3,001,739, issued to Faget et al. on Sep. 26, 1961, discloses a space capsule having a blunt forebody, a narrow afterbody and a top cylindrical container is shown as being positioned atop a launching vehicle, such for example as a rocket or missile motor, by means of an adapter pedestal secured to the nose portion of the launching vehicle. The capsule is detachably seated upon the pedestal by a circumscribing split ring having one or more explosive bolts connected between segments of the split clamp ring. Mounted atop the capsule container is the emergency separation unit of the present invention. The unit consists of separate rocket motors and supported by a tower. The base of the tower is detachably secured to the capsule container by a clamp ring having one or more explosive bolts normally maintaining the segments thereof in a continuous ring. The rocket motor is of a size suitable to rapidly lift the capsule a predetermined safe separation distance from the launching motor in the event of an impending failure thereof. A preferred rocket motor design would provide for a separation distance of approximately 250 feet during the first second of rocket motor operation. The rocket motor is provided with three nozzles which nozzles are equidistantly spaced and suitably canted so as to direct the rocket blast outward and away from the tower and capsule. The rocket motor is positioned under rocket motor and is of a suitable size to effect jettisoning of the separation unit, as will be more fully explained hereinafter. A ballast is positioned on the rocket motor for maintaining the capsule statically stable and trim in the same attitude as the capsule would maintain during a normal launching. An aerodynamic spike may be vertically disposed atop the ballast for developing a shock wave which will reduce the heating of the capsule by aerodynamic friction during the launching flight period.

U.S. Pat. No. 3,576,298, issued to Barnett et al. on Apr. 27, 1971, discloses an aerospace vehicle is described comprising a substantially conical forward crew compartment or command module mated to a substantially cylindrical rearward service module. Aerodynamic fairings are provided along the midline on the sides of the cylindrical portion and a substantial distance aft thereof for providing lift at hypersonic velocities and approximately vertical fins are provided on the fairings for aerodynamic stability and control. Wings are mounted within the aerodynamic fairings at high velocities and pivotably extended therefrom at lower velocities and altitudes to provide low speed lift. Upon reentry into the earth's atmosphere hypersonic lift is provided by the body and the fairings for bringing the vehicle to the area of a selected landing site and, at lower flight speeds deeper into the atmosphere, augmented lift is provided by the extended wings for landing the vehicle on a conventional runway. A rocket engine for propulsion has a large expansion ratio bell for use in the vacuum of space. The large ratio bell is jettisonable to give a low expansion ratio for use of the same engine within the atmosphere. Rear landing skids are pivotable into and out of the wake of the vehicle to reduce the requirement for heat shielding. Similarly, reaction control rocket motors are also pivotable into and out of the wake of the vehicle for minimizing heat protection requirements. Such a vehicle is readily adaptable to a broad variety of space missions such as cargo ferry or satellite recovery, and is reuseable with minimum refurbishment.

U.S. Pat. No. 3,999,728, issued to Zimmer on Dec. 28, 1976, discloses an escape capsule integrally designed within a parent aircraft and having a fly-away capability throughout the entire speed range of the parent aircraft. The capsule utilizes segments of the leading edges of the aircraft wings to provide flight capability and stabilization to the capsule, an elevon system controlling the capsule about both its lateral and longitudinal axes, and rudder and vertical stabilizing elements for controlling the capsule about its vertical axis. A rocket is provided to supply the thrust necessary to accomplish positive separation of the capsule from the parent aircraft along a required trajectory. A thrust system, such as a turbojet or fan jet engine, is provided for sustaining the capsule in flight.

U.S. Pat. No. 4,887,780, issued to Goodrich et al. on Dec. 19, 1989, discloses an orbiter escape pole. A shuttle type of aircraft with an escape hatch has an arcuately shaped pole housing attachable to an interior wall and ceiling with its open end adjacent to the escape hatch. The crew escape mechanism includes a magazine and a number of lanyards, each lanyard being mounted by a roller loop over the primary pole member. The strap on the roller loop has stitching for controlled release, a protection sheath to prevent tangling and a hook member for attachment to a crew harness.

U.S. Pat. No. 5,143,327, issued to Martin on Sep. 1, 1992, discloses a heavy launch vehicle for placing a payload into a spatial Earth orbit including an expendable, multi-container, propellant tank having a plurality of winged booster propulsion modules releasably disposed about one end thereof; and a payload supported by adapter structure at the other end. The preferred payload is an entry module adapted to be docked to a space station and used as a return vehicle for the space station crew, as scheduled, or in emergency situations. Alternately, the payload may include communication satellites, supplies, equipment and/or structural elements for the space station. The winged propulsion modules are released from the expendable propellant tank in pairs and return to Earth in a controlled glide, for safe landing at or near the launch site and prepared for reuse. The rocket engines for each propulsion module are dual-fuel, dual-mode engines and use methane-oxygen and hydrogen-oxygen, respectively, from the multi-containers of the propellant tank. When the propulsion modules are released from the expendable propellant tank, the rocket engines are pivotally moved into the module cargo bay for the return glide flight.

U.S. Pat. No. 5,526,999, issued to Meston on Jun. 18, 1996, discloses a spacecraft with a crew escape system. The spacecraft comprises a fuselage, a wing, a power unit incorporating two liquid-propellant launching rocket engines, two liquid-propellant boost rocket engines, six transverse-thrust rocket engines located in the spacecraft fuselage on a rotatable ring, solid-propellant emergency deceleration rocket engines, and solid-propellant additional boosting rocket engines, a payload compartment, a crew compartment, a tail unit with two vertical fin struts, a bottom tailplane, and a top tailplane. The fuselage is provided with a movable center conical body. The spacecraft landing gear has a swivelling tail wheel. The crew compartment is interposed between the fin struts under the top tailplane. The spacecraft is provided with an orbital maneuvering system whose final control elements are in fact low-thrust rocket engines, and gyrodynes. The crew escape system comprises an escape module which is in fact a recoverable ballistic capsule held to the end face of the tail portion of the fuselage. The capsule communicates with the crew compartment through a tunnel provided with means for crew transfer from the crew compartment to the capsule. The capsule has a front and a rear hatch, an aerodynamic decelerator, and a parachute system. The front portion of the capsule has a heat-protective coating. The center of mass of the capsule is displaced towards its front portion.

U.S. Pat. No. 5,572,864, issued to Jones on Nov. 12, 1996, discloses a solid-fuel, liquid oxidizer hybrid rocket turbopump auxiliary engine. A propulsion thruster includes a solid-fuel, liquid-oxidizer main rocket engine, a tank of liquid oxygen, and a turbine-driven pump for pumping liquid oxygen to the main engine. A solid-fuel, liquid-oxidizer auxiliary engine has its oxidizer input port coupled to the output of the turbopump, for generating drive fluids for the turbine of the turbopump. The temperature of the turbine drive fluids is reduced to prevent damage to the turbine, and the mass flow rate is increased, by injecting water from a tank into the drive fluids at the output of the auxiliary engine. Starting is enhanced by preventing cooling of the solid fuel by the liquid oxidizer, which is accomplished by applying gaseous oxygen from a tank to the oxidizer input port of the auxiliary engine.

U.S. Pat. No. 6,629,673, issued to Casillas et al. on Oct. 7, 2003, discloses an adaptable solid-hybrid rocket for crew escape and orbital injection propulsion. The invention relates to a propulsion system for transporting a crew transfer vehicle. The propulsion system has a casing which defines a chamber, a solid propellant system positioned within the chamber for generating one of emergency escape propulsion during an emergency portion of an ascent flight and orbital injection propulsion during normal flight operations, and a sustain propulsion system communicating with the chamber for sustaining one of the emergency escape propulsion during the emergency portion of the ascent flight and orbital injection propulsion during the normal flight operations. In one embodiment of the invention, the sustain propulsion system comprises a hybrid solid fuel grain and liquid oxidizer system. In a second embodiment of the invention, the secondary propulsion system comprises a liquid fuel and liquid oxidizer system.

U.S. Pat. No. 7,484,692, issued to McKinney et al. on Feb. 3, 2009, discloses an integrated abort rocket and orbital propulsion system. An orbital stage system has an orbital stage and one or more launch stages. The orbital stage incorporates an orbital maneuvering system (OMS) and an abort propulsion system which both utilize the same propellants, propellant tankage, and propellant pressurization system, but which employ radically different engines. The OMS engines are comprised of at least two engines which have a combined thrust in the neighborhood of 1/10 the weight of the orbital stage, an area ratio of 50 or more and an operating life of many hundred seconds, preferably many thousands of seconds or more. The abort engine may be a single engine and typically has a thrust of three, four, or more times the weight of the vehicle and an area ratio in the neighborhood of two and an operating life of at most a few tens of seconds.

U.S. Patent Application No. 2007/0012821, published to Buehler on Jan. 18, 2007, discloses that a launch vehicle upper-stage escape system allows a crew capsule or a payload capsule to be safely and rapidly separated from a launch vehicle in the event of an emergency using the upper stage main engine for propulsion. During the initial portion of the flight the majority of the propellant mass for the upper stage is stored in the lower stage. This minimizes the mass of the upper stage allowing the upper stage main engine to provide sufficient acceleration to lift the capsule off of the launch vehicle and to move the capsule away from the launch vehicle to a safe distance with sufficient speed in the event of an emergency. It can also be used to lift the crew or payload capsule to a sufficient height for recovery systems to be employed successfully in the event of an on-pad or low-altitude launch emergency.

U.S. Patent Application No. 2008/0265099, published to Camarda et al. on Oct. 30, 2008, discloses an annular fairing having aerodynamic, thermal, structural and acoustic attributes that couples a launch abort motor to a space vehicle having a payload of concern mounted on top of a rocket propulsion system. A first end of the annular fairing is fixedly attached to the launch abort motor while a second end of the annular fairing is attached in a releasable fashion to an aft region of the payload. The annular fairing increases in diameter between its first and second ends.

U.S. Patent Application No. 2009/0211258, published to Bulman on Aug. 27, 2009, discloses that improved rocket nozzle designs for vehicles with nozzles embedded in or protruding from surfaces remote from the desired thrust axis. The nozzle configurations are for rocket vehicles where the nozzles are not located at the optimal thrust axis of the vehicle. Two examples include nozzles located on the forward end of the vehicle (also called tractor nozzles) and attitude control nozzles located on the periphery of the vehicle. More particularly, the disclosed nozzle shapes enhance the axial thrusts and/or maneuver torques on the vehicle. These unconventional nozzle shapes improve vehicle performance.

WIPO Application No. WO 2008/105967 A2, published to Raytheon Company on Sep. 4, 2008, discloses a propulsion system that includes a canted multinozzle plate, which has a multitude of small nozzles angled (not perpendicular) to major surfaces of the multinozzle grid plate. The multinozzle plate may be a cylindrical section or plate, and the multitude of nozzles may be substantially axisymmetric about the cylindrical plate. The propulsion system includes a pressurized gas source which may be placed either forward or aft of the multinozzle grid plate. The propulsion system may have a conical insert, an internal flow separator cone, to aid in changing directions of flow from the pressurized gas source, to divert the flow through the multiple nozzles.

U.S. Pat. No. 6,457,306, issued to Abel, et al. on Oct. 1, 2002, discloses a liquid propellant supply system being electrical in nature and avoids the need for a gas generator and a turbine assembly. In particular, the system includes an electrical power source, a controller and a motor for driving the pump.

U.S. Pat. No. 7,762,498, issued to Henderson, et al. on Jul. 27, 2010, discloses a high-efficiency spacecraft propulsion system, including includes electric pumps inserted in the oxidizer and fuel lines that increase liquid apogee engine ("LAE") operating pressure and reduce tank-operating pressure. An on-board computer generates pump drive signals, in response to measured oxidizer and fuel line pressures, that are input to the pump controller electronics.

U.S. Patent Application No. 2011/0017873A1, published to Raymond on Jan. 27, 2011, discloses an apparatus for driving a pump for fueling a rocket engine of a space vehicle. The apparatus comprises an inertia wheel and a transmitting device to transmit a rotation of the inertia wheel to the pump. The apparatus further comprises a measuring device to measure the rotation speed of the inertia wheel a clutching device to decouple the wheel and the pump for a speed lower than a pre-determined speed lower, which is lower than the nominal rotation speed of the wheel. The invention is particularly applicable to a space vehicle comprising a rocket engine wherein the fuel supply system comprises at least one pump driven by the apparatus of the invention and a starting device to start the apparatus while the space vehicle is in flight.

U.S. Patent Application No. 2009/0293448A1, published to Grote, et al. on Dec. 3, 2009, discloses a rocket engine for use in space transport industry, includes recirculating cooling system coupled to gap between inner and outer shells, in at least two locations, to recirculate convective coolant through gap. The pump of propulsion system is a centrifugal pump driven by an electric motor.

U.S. Pat. No. 5,407,331, issued to Atsumi on Apr. 18, 1995, discloses a motorised vehicle fuel pump that has inner rotating wheel on bearing with magnet on bearing which is lubricated and cooled by fuel.

U.S. Pat. No. 5,636,512, issued to Culver on Jun. 10, 1997, discloses a nuclear thermal rocket engine for space missions that comprises auxiliary feed apparatus coupled to primary feed apparatus, and operatable in zero, low and high thrust modes.

U.S. Pat. No. 5,475,722, issued to Culver on Dec. 12, 1995, discloses a nuclear thermal rocket engine that comprises nuclear reactor core with multiple fuel assemblies, reflector assembly surrounding core, vessel housing reflector and core, etc. To help start pumps, an electric pump is positioned along an alternative flow path between main tank and pumps. Electric pump initially draws hydrogen from main tank to start the flow of hydrogen through pumps. Once pumps begin running, electric pump is turned off and the hydrogen flows through valves. Electric pump can also be used as a back-up pump if a mechanical problem occurs or for low thrust operation during flight.

U.S. Pat. No. 7,104,507, issued to Knight on Sep. 12, 2006, discloses a manned rocket for space tourism that has air-breathing external combustion rocket engine with fuel tank configured to contain fuel combustible with air, where combustor is connected to fuel tank.

U.S. Pat. No. 3,021,671, issued to Wallach on Feb. 20, 1962, discloses a rocket engine, consisting in principle of a combustion chamber which is rear to front charged, an appliance chamber containing an electric motor, two high-pressure reciprocal pumps, two air-traps and an electric battery or batteries; further it consists of a liquid fuel and oxidizer compartment, such liquid fuel and oxidizer compartments being interconnected with the rear of the combustion chamber by means of suitable ducts, and such ducts interposed with appropriate artifices such as a reciprocal pump and an airtrap.

U.S. Pat. No. 3,017,745, issued to Shirley, et al. on Jan. 23, 1962, discloses a pressure responsive switch, comprising a diaphragm associated with electrical contacts, is also connected to the main hydrogen peroxide supply line between the hydrogen peroxide pump and the on/off valve referred to, and this switch is arranged to interrupt the power supply to the electric motor driving the starter pump when the pressure of hydrogen peroxide in the main supply line reaches a predetermined value which is sufficient to provide oxygen and superheated steam to drive the turbine.

U.S. Pat. No. 3,516,251, issued to Andrews, et al. on Jun. 23, 1970, discloses that instead of driving the pumps by the turbine, they may be driven by an electric motor.

U.S. Pat. No. 5,636,509, issued to Abel on Jun. 10, 1997, discloses a heat and pressure energy conservation rocket powered flywheel engine that has non-radial propulsion units for generating thrust having drive shaft mounting for rotation and heat conservation unit for reclaiming heat energy. Stored electrical energy from the battery may be used to drive electrical systems that may include electric motors used to power starters or rocket igniters or other systems associated with the engine and vehicle.

U.S. Patent Application No. 2003/0010013A1, published to Johnstone on Jan. 16, 2003, discloses a catalytic turbine in electric power generation system that has rocket engines that produce steam exhaust without toxins, by combustion of hydrogen produced by reaction of water with metal hydride. The fuel preferably is fed to the system initially by a manual pump, or by an electric pumping system. Once the rotor assembly begins to turn, however, a mechanical or electric pump connected to a drive link on the rotor assembly can draw the fuel from the tank to the tip of the impeller blades in the rotor assembly.

U.S. Pat. No. 6,371,740, issued to Jansen on Apr. 16, 2002, discloses a combustible fuel supply system for gas turbine, rocket or jet engine, that includes fuel metering pump which provides constant pressure fuel to fuel consumption device without using accumulator metering valve.

U.S. Patent Application No. 2011/0017874A1, published to Haase on Jan. 27, 2011, discloses a storing method for fuel, e.g. hydrogen and oxidizer, such as oxygen, in space ship, space vessel and non-earth body. Involves performing heat rejection from a liquid flow through radiation and/or heat exchange with heat rejection fluid.

U.S. Pat. No. 5,043,617, issued to Rostron on Aug. 27, 1991, discloses a drive system for pump-compressor that includes several motors, each operating at 12 V and drawing current not greater than 350 mA at 2.5 W.

U.S. Patent Application No. 2010/0252686A1, published to Raymond, et al. on Oct. 7, 2010, discloses a supply pump motorizing device for rocket engine of space plane that has aerobic type internal combustion engine supplied with oxidant and fuel through fuel and oxidant tanks, where fuel and oxidant tanks are independent from propellant tank.

U.S. Pat. No. 5,607,123, issued to Larsen on Mar. 4, 1997, discloses a thrust-vectoring system for rocket nozzles that has force attenuator in order to limit transient loads which nozzle and associated structure experience.

The Applicant is unaware of inventions or patents, taken either singly or in combination, which are seen to describe the instant invention as claimed.

SUMMARY OF THE INVENTION

The present invention relates to an improved rocket stage and a method of improving an existing rocket stage.

In a first embodiment of the present invention, an improved rocket stage includes an existing rocket stage designed for a liquid fuel and a liquid oxidizer. The existing rocket stage includes a fuel tank designed for storing the liquid oxidizer; an oxidizer tank designed for storing the liquid fuel; an engine in operative communication with the fuel tank and oxidizer tank; at least one fuel sensor compatible with the liquid fuel, wherein the fuel sensor is positioned in the oxidizer tank; and at least one oxidizer sensor compatible with the liquid oxidizer, wherein the oxidizer sensor is positioned in the fuel tank, wherein the fuel tank contains at least a partial load of liquid oxidizer, and wherein the oxidizer tank contains at least a partial load of liquid fuel.

In an additional embodiment of the present invention, a method of improving an existing rocket stage, includes the steps of:

providing an existing rocket stage designed for liquid hydrogen fuel and liquid oxygen;

providing a hydrogen tank designed for storing liquid oxygen;

providing an oxygen tank designed for storing liquid hydrogen fuel;

providing an engine in operative communication with the hydrogen tank and oxygen tank;

providing at least one hydrogen sensor compatible with liquid hydrogen fuel, wherein the hydrogen sensor is positioned in the oxygen tank; and providing at least one oxygen sensor compatible with liquid oxygen, wherein the oxygen sensor is positioned in the hydrogen tank, wherein the hydrogen tank contains at least a partial load of liquid oxygen, and wherein the oxygen tank contains at least a partial load of liquid hydrogen fuel.

It should be understood that the above-attached figures are not intended to limit the scope of the present invention in any way.

DETAILED DESCRIPTION OF THE PREFERRED EMBODIMENTS

The present invention relates to an improved rocket stage and a method of improving an existing rocket stage.

Referring to FIGS. 1A and 2A-6, an embodiment of the present invention is an improved rocket stage.

There exist many rocket stages in service around the world. All of these have been optimized for the exact propellant loads for missions, and that ideals of engineering have sought to minimize stage gross liftoff weight or wet weight, and to maximize engine exhaust velocity of specific impulse.

In general, a rocket stage is defined as a set of propellant tanks, a rocket engine consisting of a combustion chamber throat and nozzle, and sufficient sensors and effectors to monitor operations and provide needed guidance and control.

The improved rocket stage of this embodiment is where one can take existing stages and re-propellant them and improve performance or dramatically reduce cost. This involves taking an existing or pre-existing rocket stage designed for liquid hydrogen and liquid oxygen; swapping the valves, sensors and fittings between the two tanks 460, 462; placing liquid oxygen into what would have been the hydrogen tank; and placing a hydrocarbon fuel, such as, but not limited to, methane, propane, butane, or kerosene, into what would have been the oxygen tank.

The improved rocket stage includes an existing rocket stage, which includes a hydrogen tank 460, an oxygen tank 462, an engine 492, at least one hydrogen sensor, and at least one oxygen sensor.

The existing rocket stage is originally designed for liquid hydrogen fuel and liquid oxygen fuel.

The hydrogen tank 460, originally designed for storing liquid hydrogen fuel, will be converted to store liquid oxygen in the present invention.

The oxygen tank 462, originally designed for storing liquid oxygen, will be converted to store liquid hydrogen in the present invention.

The engine 478 is in operative communication with the hydrogen tank 460 and oxygen tank 462.

Preferably, there are multiple hydrogen sensors that are compatible with liquid hydrogen fuel. The hydrogen sensors are positioned within the oxygen tank 462.

Preferably, there are multiple oxygen sensors that are compatible with liquid oxygen. The oxygen sensors are positioned within the hydrogen tank 460.

The hydrogen tank 460 is adapted for receiving or containing a partial or full load of liquid oxygen.

The oxygen tank 462 is adapted for receiving or containing a partial or full load of liquid fuel. Preferably, the tanks 462 and 460 respectively contain a full load of hydrogen or hydrocarbons and a partial load of oxygen.

The improved rocket stage may further include at least one secondary system item selected from the group consisting of valves, ports, plumbing, controls, and any combination thereof. Also, the improved rocket stage may further include at least one device selected from the group consisting of a secondary fluid storage tank 431 (payload; in operative communication with engine) and a docking adapter 436. (SEE FIG. 1A)

The improved rocket stage has the ability to deliver liquid oxygen propellant to a destination in space, such as, but not limited to, a propellant depot, another space vehicle, or a capsule/space station requiring fuel.

When applicable, additional liquid oxygen fuel may be further loaded into the former hydrogen tank 462.

Figure 1A:
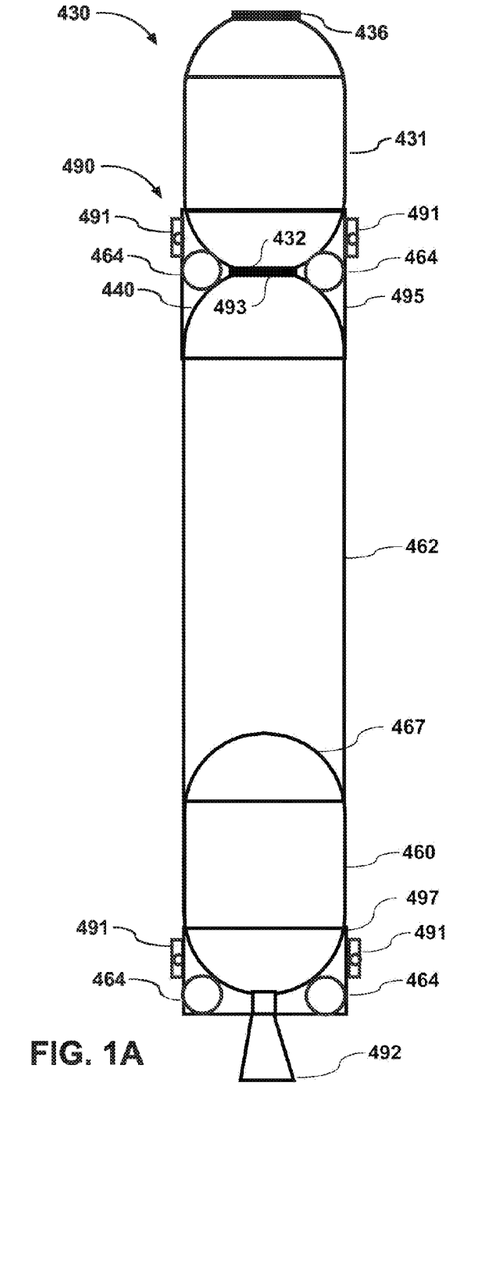
FIG. 1A is a schematic, cut-away view of an embodiment of an improved rocket stage according to the present invention, showing examples of internal devices, components, and a secondary fluid storage tank.
Figure 1B:
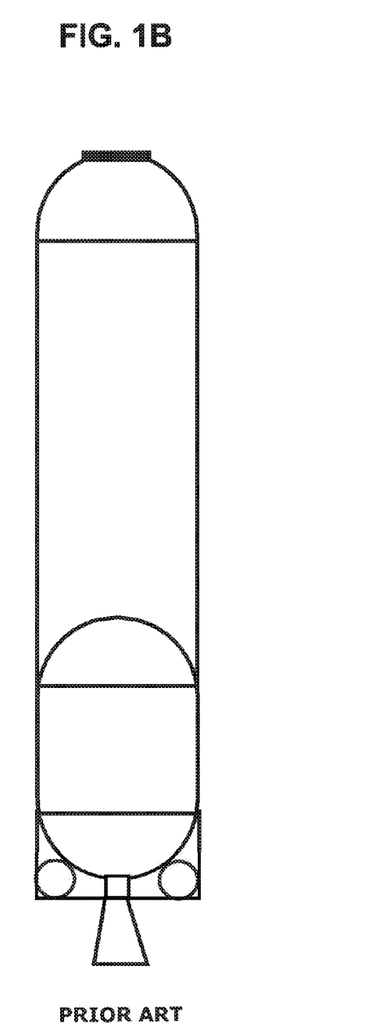
FIG. 1B is a schematic, cut-away view of an example of a prior art rocket stage.
Figure 2A:
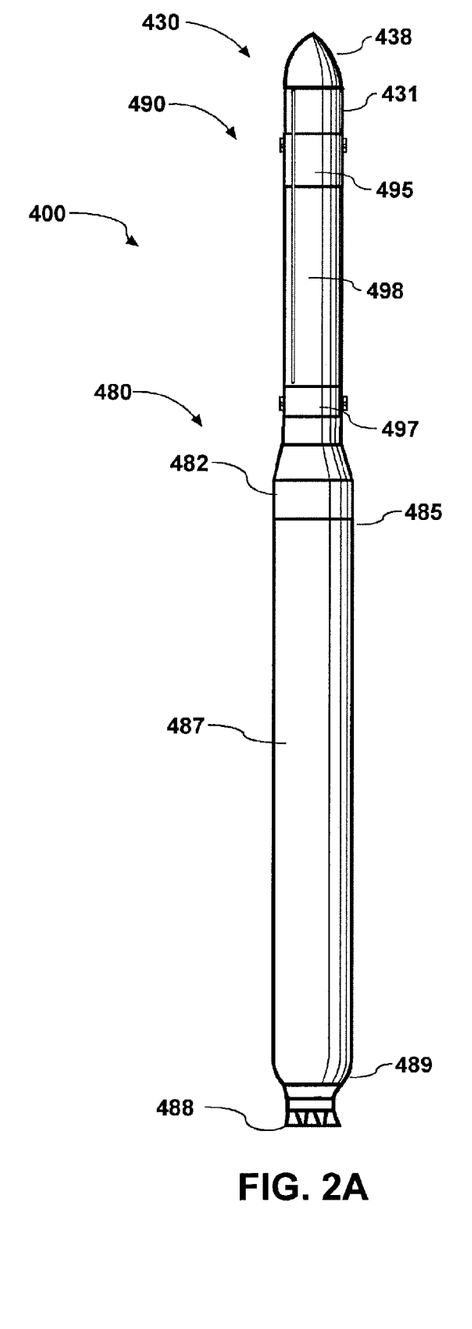
FIG. 2A is a front, perspective view of an embodiment of an improved rocket stage according to the present invention, wherein the improved rocket stage is secured or attached to a launch vehicle.
Figure 2B:
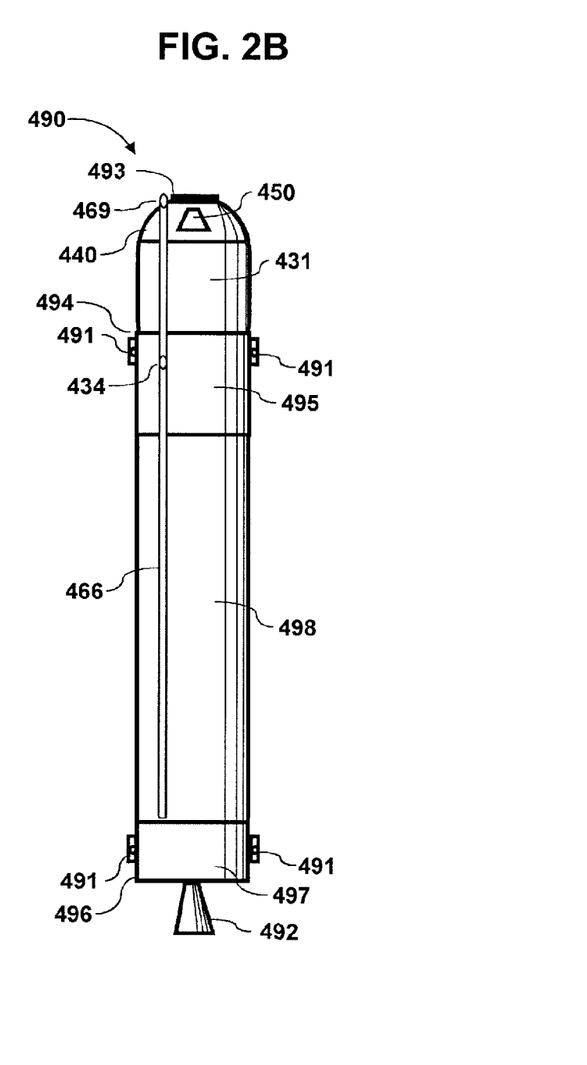
FIG. 2B is a front, perspective view of an embodiment of an improved rocket stage according to the present invention, wherein the improved rocket stage includes additional devices, components, and/or plumbing.
Figure 3:
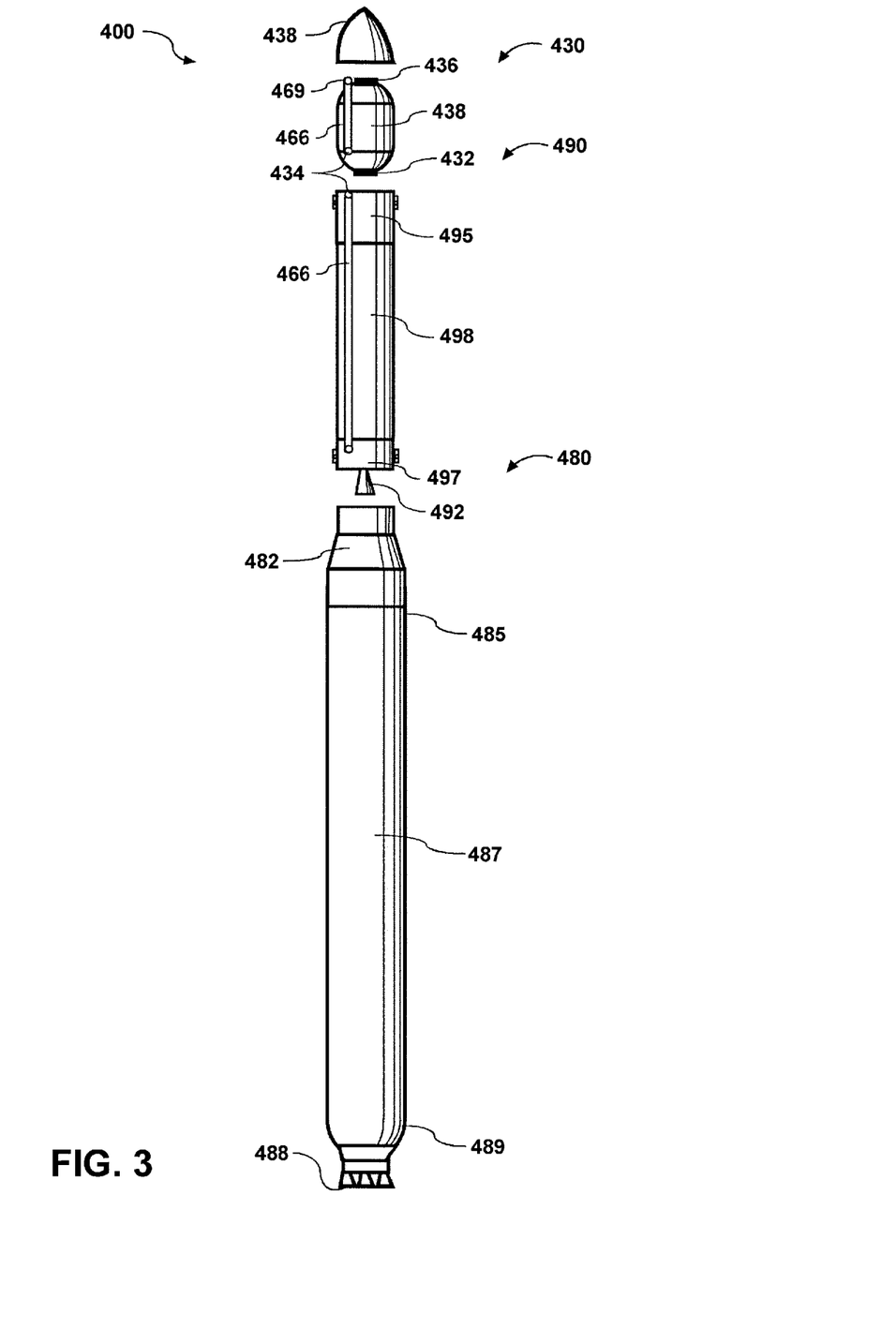
FIG. 3 is an exploded view of the improved rocket stage of FIG. 2A.
Figure 4A:
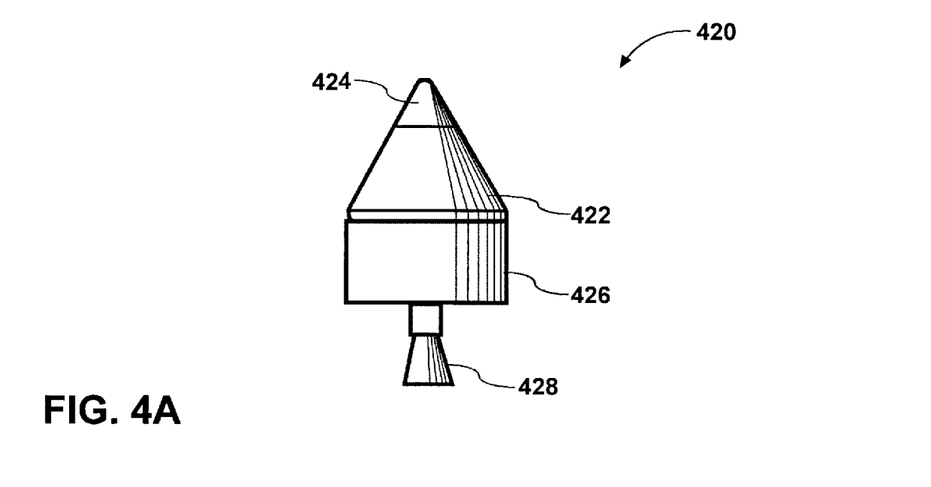
FIG. 4A is a front, perspective view of a space capsule.

FIG. 4A shows a space capsule 420 that includes a unit 422, a docking adapter 424, a unit 426, and an engine 428.

Figure 4B:
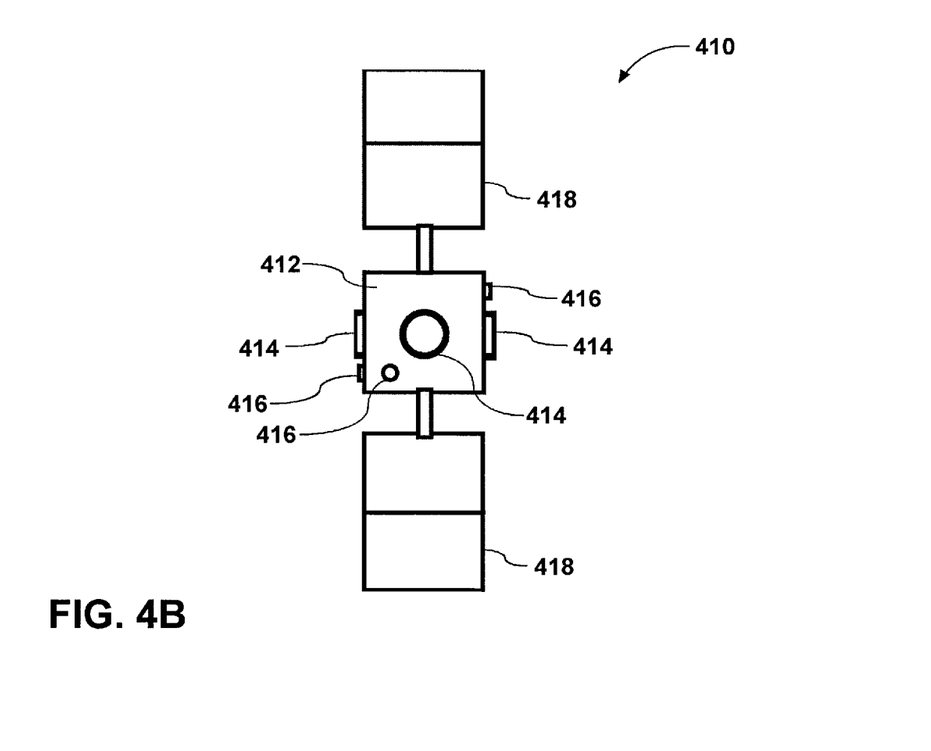
FIG. 4B is a front view of a basic element for a propellant depot dock.
Figure 5:
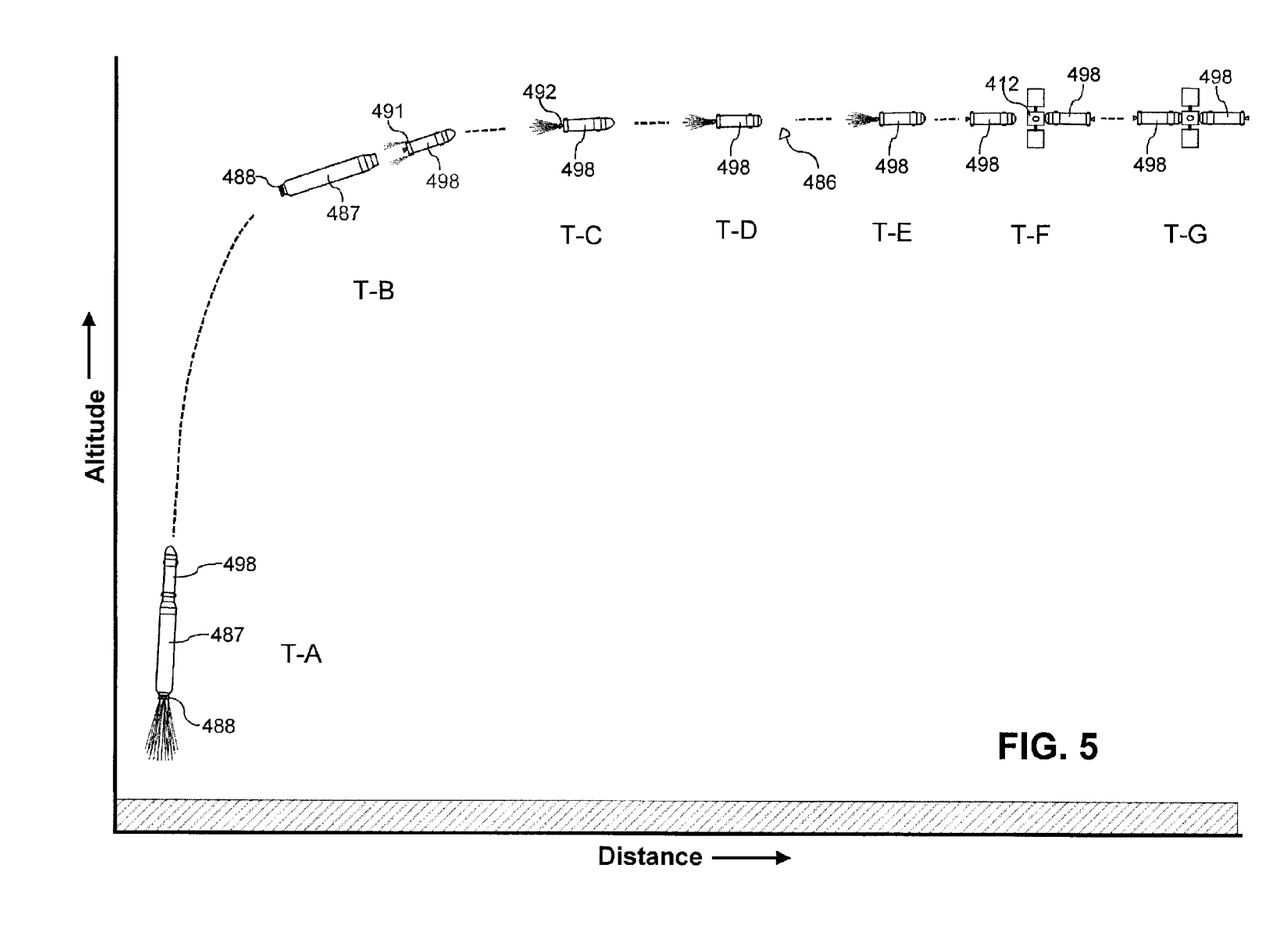
FIG. 5 is a schematic review of a timeline, showing different stages of a launch, a flight, and a jettisoning of devices and components, of an improved rocket stage according to the present invention, wherein the improved rocket stage includes additional devices, components, and/or plumbing, and wherein the improved rocket stage engages with a propellant depot dock.
Figure 6:
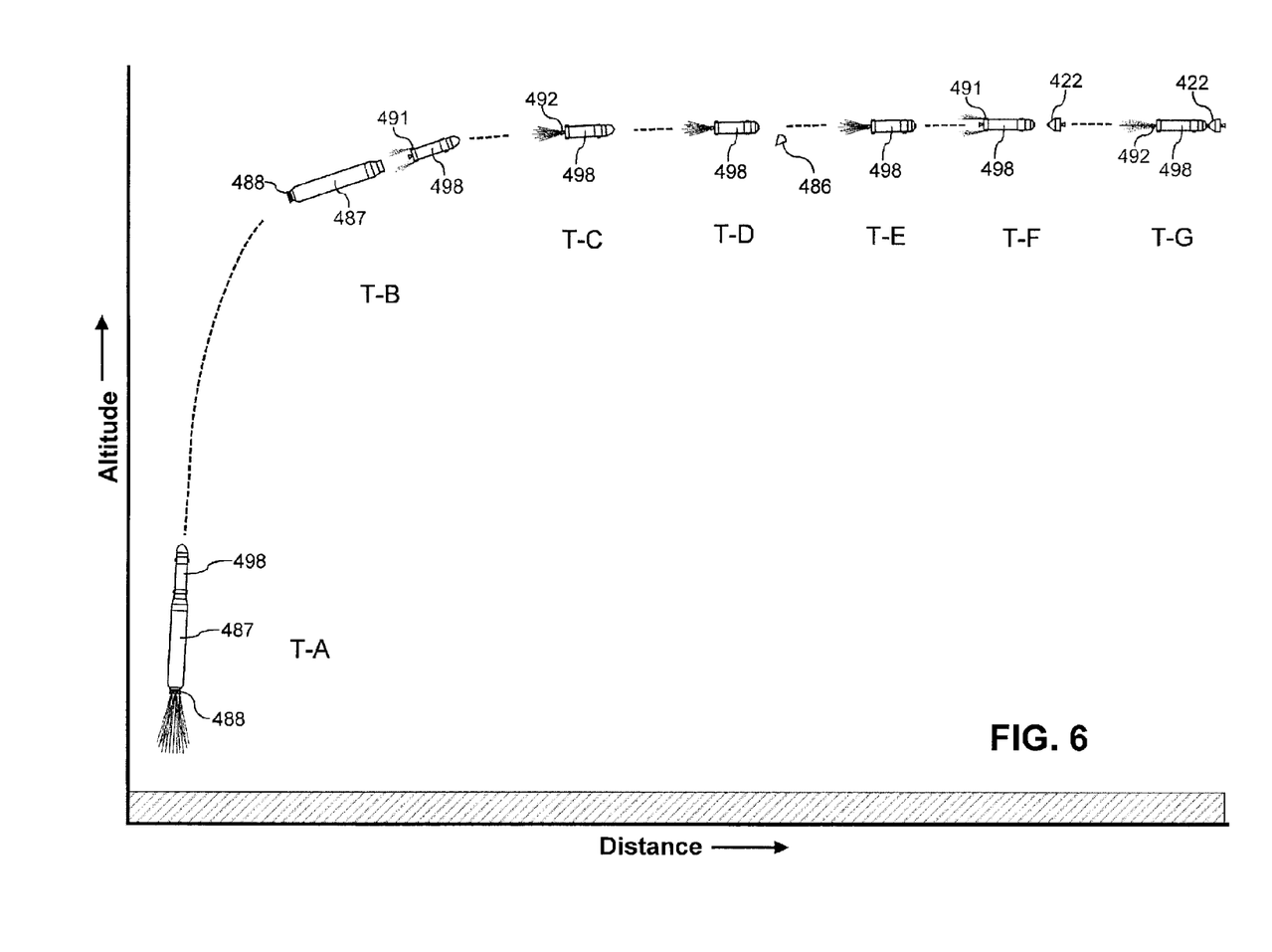
FIG. 6 is a schematic review of a timeline, showing different stages of a launch, a flight, and a jettisoning of devices and components, of an improved rocket stage according to the present invention, wherein the improved rocket stage includes additional devices, components, and/or plumbing, and wherein the improved rocket stage engages with a previously-launched space capsule.

FIG. 4B shows a basic element for a propellant depot dock 410 that includes a fuel depot body, 412, a fuel depot docking adapter 414, a fuel and oxidizer docking coupling 416, and a fuel depot solar panel 418.

An additional embodiment of the present invention is a method of improving an existing rocket stage, including the steps of:

providing an existing rocket stage designed for liquid hydrogen fuel and liquid oxygen;

providing a hydrogen tank 460 designed for storing liquid oxygen;

providing an oxygen tank 462 designed for storing liquid hydrogen fuel;

providing an engine 492 in operative communication with the hydrogen tank 460 and the oxygen tank 462;

providing at least one hydrogen sensor compatible with liquid hydrogen fuel, wherein the hydrogen sensor is positioned in the oxygen tank 462; and providing at least one oxygen sensor compatible with liquid oxygen, wherein the oxygen sensor is positioned in the hydrogen tank 460, wherein the hydrogen tank 460 contains at least a partial load of liquid oxygen, and wherein the oxygen tank 462 contains at least a partial load of liquid hydrogen fuel.

The method may further include the step of further loading additional liquid oxygen into the hydrogen tank 462.

Also, the method may further include the step of providing at least one secondary system item selected from the group consisting of valves, ports, plumbing, controls, and any combination thereof.

Further, the method may further include the step of providing at least one device selected from the group consisting of a secondary fluid storage tank 431 (payload; in operative communication with engine) and a docking adapter. (SEE FIG. 1A)

Result: this is a heavier stage with higher delta V (change in velocity), and longer orbital duration than a hydrogen stage (very light).

This embodiment involves a conversion of existing hydrogen fueled stages over to propane/methane/butane (Chiron) or other dense warm cryogenic fuels. While volumetrically less efficient then the hydrogen or a clean sheet design stage, this will provide an improved mass fraction/mass ratio sufficient to increase performance to orbit.

It is to be understood that the present invention is not limited to the embodiments described above or as shown in the attached figures, but encompasses any and all embodiments within the spirit of the invention.

What is claimed is:

1. An improved rocket stage comprising:
a rocket stage designed for a liquid fuel and a liquid oxidizer,
wherein said rocket stage comprises:
a fuel tank originally designed for storing the liquid fuel;
an oxidizer tank originally designed for storing the liquid oxidizer,
wherein said oxidizer tank is smaller volumetrically than said fuel tank;
a rocket engine in operative communication with said fuel tank and said oxidizer tank;
at least one fuel sensor compatible with the liquid fuel, wherein said fuel sensor is positioned inside of said oxidizer tank; and
at least one oxidizer sensor compatible with the liquid oxidizer, wherein said oxidizer sensor is positioned inside of said said fuel tank,
wherein said fuel tank is filled with liquid oxidizer for use by said rocket engine,
wherein said oxidizer tank is filled with a partial load or a full load of liquid fuel for use by said rocket engine, and
wherein said fuel tank is filled with additional liquid oxidizer to deliver to a destination in space including at least one of: a propellant depot, another space vehicle, or a capsule/space station.

2. The improved rocket stage according to claim 1, wherein said
liquid fuel is liquid hydrogen or liquid hydrocarbon fuel, wherein said liquid oxidizer is liquid oxygen wherein said fuel tank is a liquid hydrogen tank or a liquid hydrocarbon fuel tank, wherein said oxidizer tank is a liquid oxygen tank, wherein said at least one fuel sensor is at least one liquid hydrogen sensor or liquid hydrocarbon fuel sensor, and wherein said at least one oxidizer sensor is at least one liquid oxygen sensor.

3. The improved rocket stage according to claim 2, further comprising at least one secondary system item selected from the group consisting of valves, ports, plumbing, controls, and any combination thereof.

4. The improved rocket stage according to claim 2, further comprising at least one device selected from the group consisting of a secondary fluid storage tank and a docking adapter.

5. The improved rocket stage according to claim 2, wherein said liquid oxidizer tank contains a full load of liquid hydrogen fuel or liquid hydrocarbon fuel.

6. A method of improving a rocket stage, comprising the steps of:
providing a rocket stage designed for a liquid fuel and a liquid oxidizer;
providing a fuel tank originally designed for storing the liquid fuel;
providing an oxidizer tank originally designed for storing the liquid oxidizer,
wherein said oxidizer tank is smaller volumetrically than said fuel tank;
providing a rocket engine in operative communication with said fuel tank and said oxidizer tank;
providing at least one fuel sensor compatible with the liquid fuel;
re-positioning said at least one fuel sensor from inside of said fuel tank to inside of said oxidizer tank;
providing at least one oxidizer sensor compatible with the liquid oxidizer;
re-positioning said at least one oxidizer sensor from inside of said oxidizer tank to inside of said fuel tank;
modifying said fuel tank to store a partial load or a full load of liquid oxidizer for use by said rocket engine; and
modifying said oxidizer tank to store a partial load or a full load of liquid fuel for use by said rocket engine.

7. The method of improving a rocket stage according to claim 6,
wherein said liquid fuel is liquid hydrogen or liquid hydrocarbon fuel, wherein said liquid oxidizer is liquid oxygen, wherein said fuel tank is a liquid hydrogen tank or a liquid hydrocarbon fuel tank, wherein said oxidizer tank is a liquid oxygen tank, wherein said at least one fuel sensor is at least one liquid hydrogen sensor or liquid hydrocarbon fuel sensor, and wherein said at least one oxidizer sensor is at least one liquid oxygen sensor.

8. The method according to claim 7, wherein said rocket stage has the ability to deliver liquid oxygen to a destination in space.

9. The method according to claim 7, further comprising the step of loading liquid oxygen into said liquid hydrogen tank or said liquid hydrocarbon fuel tank.

10. The method according to claim 7, further comprising the step of providing at least one secondary system item selected from the group consisting of valves, ports, plumbing, controls, and any combination thereof.

11. The method according to claim 7, further comprising the step of providing at least one device selected from the group consisting of a secondary fluid storage tank and a docking adapter.

12. The method according to claim 7, wherein said liquid oxidizer tank contains a full load of liquid hydrogen fuel or liquid hydrocarbon fuel.

13. The method according to claim 7, wherein said rocket stage has improved velocity in comparison to a stage not having said method performed.

14. The method according to claim 6, wherein an auxiliary fuel tank is added and connected to improve storage capacity of said rocket stage and is connected to said rocket engine to provide additional capability.

15. A method of improving a rocket stage comprising:
  providing a rocket stage designed for a liquid fuel and a liquid oxidizer;
  providing a fuel tank originally designed for storing the liquid fuel;
  providing an oxidizer tank originally designed for storing the liquid oxidizer,
  wherein said oxidizer tank is smaller volumetrically than said fuel tank;
  providing a rocket engine in operative communication with said fuel tank and said oxidizer tank;
  converting said oxidizer tank to store liquid fuel; and
  converting said fuel tank to store liquid oxidizer.

16. The method according to claim 15,
  wherein said liquid fuel is liquid hydrogen or liquid hydrocarbon fuel, wherein said liquid oxidizer is liquid oxygen, wherein said fuel tank is a liquid hydrogen tank or a liquid hydrocarbon fuel tank, wherein said oxidizer tank is a liquid oxygen tank, and
  further comprising providing at least one fuel sensor as a liquid hydrogen sensor or liquid hydrocarbon fuel sensor, and providing at least one oxidizer sensor as a liquid oxygen sensor.

17. The method according to claim 16, wherein said rocket stage has the ability to deliver liquid oxygen to a destination in space.

18. The method according to claim 16, wherein liquid oxygen is loaded into said liquid hydrogen tank or said liquid hydrocarbon fuel tank.

19. The method according to claim 16, further comprising providing at least one secondary system item selected from the group consisting of valves, ports, plumbing, controls, and any combination thereof.

20. The method according to claim 16, further comprising providing at least one device selected from the group consisting of a secondary fluid storage tank and a docking adapter.

21. The method according to claim 16, wherein said liquid oxygen tank is filled with a full load of liquid hydrogen fuel or liquid hydrocarbon fuel.

22. The method according to claim 16, wherein said rocket stage has improved velocity in comparison to a stage not having said method performed.

23. The method according to claim 15, wherein an auxiliary fuel tank is added and connected to improve storage capacity of said rocket stage and is connected to said rocket engine to provide additional capability.

24. The method according to claim 15, further comprising providing at least one fuel sensor, and providing at least one oxidizer sensor.

* * * * *